(12) United States Patent
Wieners et al.

(10) Patent No.: US 11,274,723 B2
(45) Date of Patent: Mar. 15, 2022

(54) CLOSURE PACKAGE, VIBRATION DAMPER, AND USE OF A SEAL HOLDER

(71) Applicants: THYSSENKRUPP BILSTEIN GMBH, Ennepetal (DE); thyssenkrupp AG, Essen (DE); THYSSENKRUPP BILSTEIN OF AMERICA INC., Poway, CA (US)

(72) Inventors: Daniel Wieners, Bochum (DE); Klaus Schmidt, Odenthal (DE); Benjamin McAlvey, San Diego, CA (US); Terrence Kane, Encinitas, CA (US)

(73) Assignees: THYSSENKRUPP BILSTEIN GMBH, Ennepetal (DE); THYSSENKRUPP AG, Essen (DE); THYSSENKRUPP BILSTEIN OF AMERICA INC., Poway, CA (US)

( * ) Notice: Subject to any disclaimer, the term of this patent is extended or adjusted under 35 U.S.C. 154(b) by 238 days.

(21) Appl. No.: 16/488,680

(22) PCT Filed: Feb. 6, 2018

(86) PCT No.: PCT/EP2018/052865
§ 371 (c)(1),
(2) Date: Aug. 26, 2019

(87) PCT Pub. No.: WO2018/153649
PCT Pub. Date: Aug. 30, 2018

(65) Prior Publication Data
US 2021/0215221 A1 Jul. 15, 2021

(30) Foreign Application Priority Data
Feb. 24, 2017 (DE) ...................... 10 2017 103 925.2

(51) Int. Cl.
*F16F 9/36* (2006.01)
*B60G 13/08* (2006.01)
(Continued)

(52) U.S. Cl.
CPC .............. *F16F 9/363* (2013.01); *B60G 13/08* (2013.01); *B60G 2202/24* (2013.01);
(Continued)

(58) Field of Classification Search
CPC .... F16F 9/363; F16F 9/185; F16F 9/19; F16F 2222/02; F16F 2222/12; F16F 2226/045;
(Continued)

(56) References Cited

U.S. PATENT DOCUMENTS 4,485,899 A * 12/1984 Grundei .................. F16F 9/062
188/277
5,485,987 A 1/1996 Jobelius et al.
(Continued)

FOREIGN PATENT DOCUMENTS

CN 201437834 U 4/2010
CN 105190084 A 12/2015
(Continued)

OTHER PUBLICATIONS

English Translation of International Search Report issued in PCT/EP2018/052865, dated May 15, 2018.

*Primary Examiner* — Xuan Lan Nguyen
(74) *Attorney, Agent, or Firm* — thyssenkrupp North America, LLC

(57) ABSTRACT

A closure package for a vibration damper may include a base body that is connectable to a damper tube and comprises a first end and a second end. The first end forms an end side of the damper tube and the second end is disposed in the damper tube. A seal for sealing a piston rod may be disposed in the base body. A seal holder may be disposed between the
(Continued)

seal and the base body at the first end. The seal holder for axially fixing the seal may be connected to the base body in a form-fitting and/or force-fitting manner. The seal holder may be fusible in an emergency. For releasing the connection to the base body, the seal holder may be thermoplastically deformable upon overheating of the vibration damper.

17 Claims, 2 Drawing Sheets

(51) Int. Cl.
*F16F 9/18* (2006.01)
*F16F 9/19* (2006.01)

(52) U.S. Cl.
CPC .............. *B60G 2206/41* (2013.01); *B60G 2206/82092* (2013.01); *B60G 2800/162* (2013.01); *F16F 9/185* (2013.01); *F16F 9/19* (2013.01); *F16F 2222/02* (2013.01); *F16F 2222/12* (2013.01); *F16F 2226/045* (2013.01); *F16F 2228/002* (2013.01); *F16F 2230/0023* (2013.01); *F16F 2230/0052* (2013.01); *F16F 2230/30* (2013.01); *F16F 2234/04* (2013.01)

(58) Field of Classification Search
CPC ......... F16F 2228/002; F16F 2230/0023; F16F 2230/0052; F16F 2230/30; F16F 2234/04
See application file for complete search history.

(56) References Cited

U.S. PATENT DOCUMENTS

| | | | | |
|---|---|---|---|---|
| 5,497,863 | A | * | 3/1996 | Schmidt .................... F16F 9/12 188/306 |
| 6,253,661 | B1 | * | 7/2001 | Fenn ..................... F16F 9/3242 92/165 R |
| 6,811,156 | B2 | * | 11/2004 | Adrian ...................... F16F 9/36 277/435 |
| 6,905,124 | B2 | * | 6/2005 | Zafar .................... F16F 9/3278 267/64.11 |
| 9,157,500 | B2 | * | 10/2015 | Cappeller ............. F16F 9/0218 |
| 9,447,834 | B2 | * | 9/2016 | Cotter .................... F16F 9/435 |
| 9,551,394 | B2 | * | 1/2017 | Cotter ................... F16F 9/0218 |
| 10,072,723 | B2 | * | 9/2018 | Hart ........................ F16F 9/363 |
| 2003/0110942 | A1 | | 6/2003 | Wirth et al. |
| 2008/0083324 | A1 | | 4/2008 | Ackermann |
| 2015/0316119 | A1 | | 11/2015 | Lehnen |

FOREIGN PATENT DOCUMENTS

| | | | | |
|---|---|---|---|---|
| DE | | 103 31 921 B | 12/2004 | |
| DE | 10 2007 007 273 A | | 4/2008 | |
| DE | 10 2007 005 690 B | | 8/2008 | |
| EP | | 0496324 A | 7/1992 | |
| EP | | 1956262 A1 * | 8/2008 | ............. F16F 9/363 |

\* cited by examiner

CLOSURE PACKAGE, VIBRATION DAMPER, AND USE OF A SEAL HOLDER

CROSS REFERENCE TO RELATED APPLICATIONS

This application is a U.S. National Stage Entry of International Patent Application Serial Number PCT/EP2018/052865, filed Feb. 6, 2018, which claims priority to German Patent Application No. DE 10 2017 103 925.2, filed Feb. 24, 2017, the entire contents of both of which are incorporated herein by reference.

FIELD

The present disclosure generally relates to vibration dampers, including closure packages and seal holders for vibration dampers.

BACKGROUND

Closure packages for vibration dampers may be used in a manner known per se in motor vehicles so as to dampen vibrations of the running gear. Vibration dampers comprise a damper tube and a working piston which is disposed so as to be movable in the manner of a reciprocating stroke in the damper tube and is connected to a piston rod. The piston rod leads out of the damper tube and is mounted and sealed so as to be axially movable in the closure package. Oil in the damper tube is moved by the movement of the working piston between two operating chambers so as to dampen vibrations.

It is known from German Patent Publication No. DE 10 2007 005 690 B4 that the closure package comprises a seal which seals in relation to the piston rod such that the oil situated in the damper tube cannot leak. The closure package comprises the further function of guiding the piston rod in the reciprocating stroke movement.

When the vibration damper is exposed to high temperatures, for example, on account of fire in the event of an accident, inexpert use or wrong storage, high pressures are created in the interior of the vibration damper. Said high pressures can lead to the vibration damper being damaged and on account thereof to damage to surrounding components.

It is known in the prior art for pressure safety valves to be used in order for the pressurized oil to be discharged in a controlled manner. Furthermore, predetermined breaking points are known so as to achieve an ideally controlled reduction in pressure. The known technical solutions are not considered sufficient in order for unintentionally high pressures in the damper tube to be minimized in a controlled manner.

Thus a need exists for a closure package with a view to a controlled and effective reduction in pressure being achieved in a simple manner in the event of an emergency when the closure package is installed in a vibration damper for closing the damper tube. A need also exists for an improved vibration damper and an improved seal holder.

DETAILED DESCRIPTION

Figure 1:
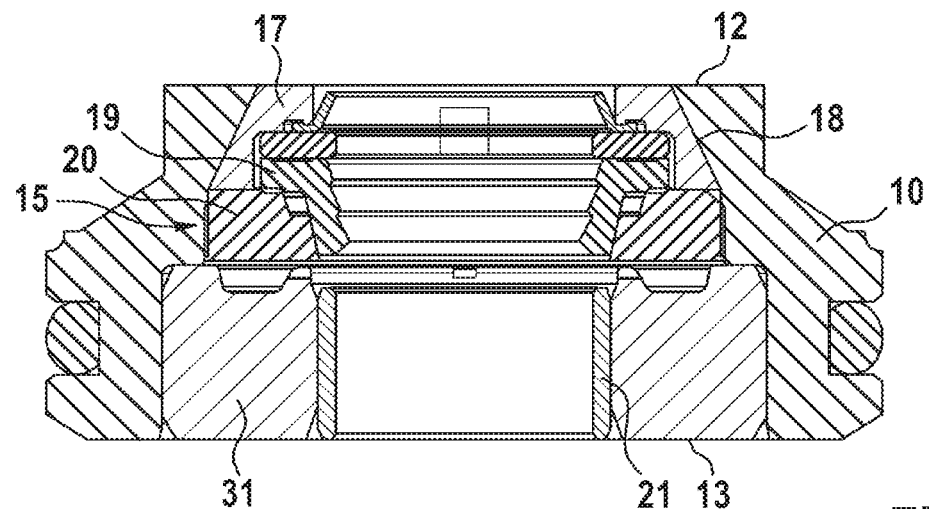
FIG. 1 is a cross-sectional view of an example closure package having a multiple-part seal.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention is based on the concept of specifying a closure package for a vibration damper having a base body which can be connected to a damper tube and comprises two ends. The first end in use, that is to say in the assembled state, forms an end side of the damper tube. The second end in use is disposed in the damper tube. The closure package furthermore includes a seal which for sealing a piston rod is disposed in the base body. A seal holder is disposed between the seal and the base body at the first end of the base body. The seal holder for axially fixing the seal in the base body is connected to the base body in a form-fitting and/or force-fitting manner. The seal holder is configured as a seal holder which is fusible in an emergency and which, in order for the connection to the base body to be released, is thermoplastically deformable in the case of an overheating vibration damper.

The invention comprises the advantage that the heat responsible for the unintentional excessive increase in pressure is used for opening the damper tube in order for the oil that is under an elevated pressure to be discharged in a controlled manner before the vibration damper is damaged. A particularly safe solution is thus achieved, because the safety function is coupled to the cause of the pressure increase. To this end, it is specifically provided according to the invention that the seal holder is configured as a seal holder which is fusible in an emergency and which, in order for the connection to the base body to be released, can be thermoplastically deformed in the case of an overheating vibration damper.

In other words, the dimensional stability of the seal holder is cancelled when reaching a critical limit temperature, so that the connection between the seal holder and the base body is severed. The seal holder on account thereof is released from the closure package and exposes the seal which, by virtue of the positive pressure prevailing in the damper tube is likewise moved out of the sealing position of said seal. An opening through which the oil can be discharged in a controlled manner is thus formed in the closure package.

It is provided according to the invention that the seal holder is disposed between the seal and the base body at the first end of the base body, thus in the region of the end side of the damper tube. It is achieved on account thereof that the seal holder in the case of a thermoplastic deformation can exit the base body without impediment and thus exposes the seal.

The invention thus makes do without complex safety valves and achieves in a simple manner an emergency safeguard which is superior to the known solutions.

Preferred embodiments of the invention are stated in the dependent claims.

The seal holder thus can include a material which comprises a thermal dimensional stability temperature in the range from −40° C. to +160° C. By setting the temperature to this range the situations that usually lead to the vibration damper malfunctioning are detected.

The base body preferably comprises a conical holding portion which tapers toward the outside. The seal holder is shaped in a corresponding manner such that a form-fitting connection, in particular form-fitting and force-fitting connection, is formed. The holding force that by way of the seal holder acts on the seal is directed in an axially inward manner such that the seal when in operation is fixed in the sealing position. When the seal holder, by virtue of high temperatures, loses the thermal dimensional stability thereof, the seal holder is pushed out of the holding portion and exposes the seal which is likewise moved out of the base body. The oil can escape through the annular gap that is created on account thereof between the piston rod and the base body.

The seal holder can at least in portions be disposed on the circumference of the seal and/or in the axial direction of the base portion can at least in portions project beyond the seal in the direction toward the first end. In both cases, the seal holder is disposed such that a holding force is exerted on the seal in use, said holding force the seal in the position thereof.

The seal can be configured in multiple parts and comprise a first rod seal for bearing on the piston rod. The seal comprises a second intermediate seal for sealing the rod seal in relation to the base body. The rod seal and the intermediate seal in the case of this exemplary embodiment are releasably connected. This comprises the advantage that a positive sealing function is maintained and the rod seal is exposed in the event of an emergency, that is to say in the case of a thermoplastic deformation of the seal holder.

Alternatively, the seal can be configured as a single part, on account of which the production and assembly of the vibration damper is simplified. It is also possible in this case that the seal is moved out of the construction position thereof and exposes the rod seal on account of the thermal dimensional stability of the seal holder being compromised.

A guide bush is preferably disposed between the seal and the second end. This is a wet guide in which the guide bush is lubricated by the oil situated in the damper tube.

The invention includes a vibration damper having a closure package according to the invention which is connected to the damper tube of the vibration damper and guides and seals the piston rod. The vibration damper can be a damper of a single-tube construction, or of a dual-tube construction or multiple-tube construction. The use in a single-tube damper is particularly preferable.

The invention furthermore includes the use of a fusible seal holder as a seal holder which is fusible in an emergency for a closure package of a vibration damper. The seal holder which is fusible in an emergency is thermoplastically deformable in the case of an overheating vibration damper. In terms of the advantages of the use, or of the vibration damper, respectively, reference is made to the explanations in the context of the closure package.

Figure 3:
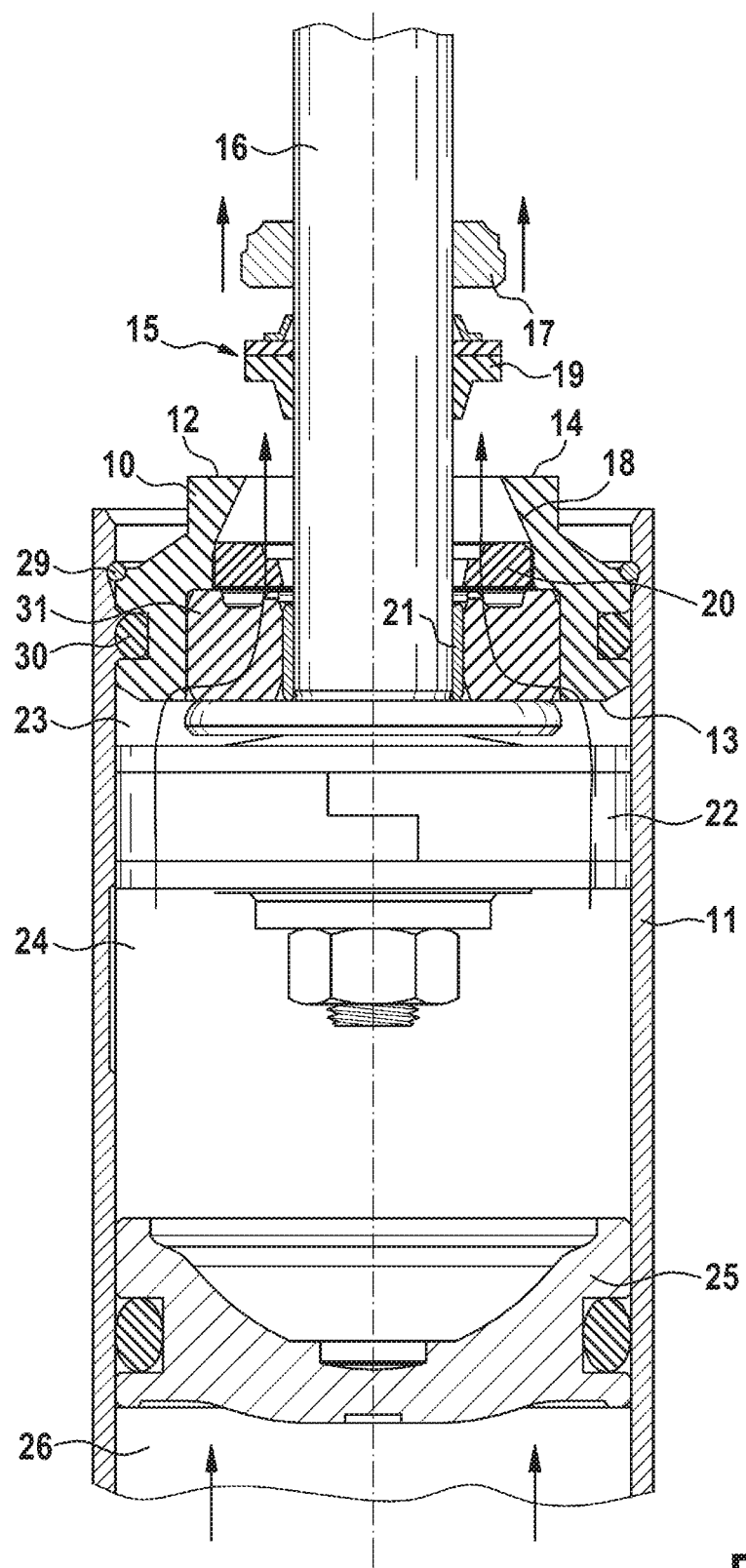
FIG. 3 is a longitudinal sectional view through an example vibration damper having an example closure package.

A longitudinal section of a vibration damper for the running gear of a motor vehicle is illustrated in FIG. 3. This example is a vibration damper in a single-tube construction mode. Other vibration dampers, for example vibration dampers in a dual-tube construction mode, can likewise be used in conjunction with the invention.

The vibration damper includes a damper tube 11 in which a working piston 22 is disposed so as to be axially movable. The working piston 22 is fixedly connected, for example, screwed, to a piston rod 16. Damping valves (not illustrated) through which the oil situated in the damper tube can pass for damping vibrations when the working piston 22 is moved in the damper tube 11 are configured in the working piston. The working piston 22 in a manner known per se subdivides the damper tube 11 into a first operating chamber 23 which is disposed on the side of the piston rod, and a second operating chamber 24 which is disposed on the side of the working piston 22 that is remote from the piston rod. In the case of a movement of the working piston 22, the oil situated in the damper tube 11 is moved between the two operating chambers 23, 24.

The second operating chamber 24 is axially delimited by a separating piston 25 which in a manner known per se closes off a gas chamber 26.

The guiding of the piston rod 16 and sealing of the latter is performed by a closure package, which is fixedly connected to the damper tube 11.

The emergency function of the closure package will be described by means of FIGS. 1 and 2, which show two exemplary embodiments of the closure package in the normal state, that is to say when usual operating pressures, for which the vibration damper is conceived, prevail in the vibration damper. By contrast, the closure package according to FIG. 3 is illustrated after the activated emergency function, wherein the oil situated in the damper tube 11 by virtue of overheating and the positive pressures associated therewith has been discharged in a controlled manner.

Figure 2:
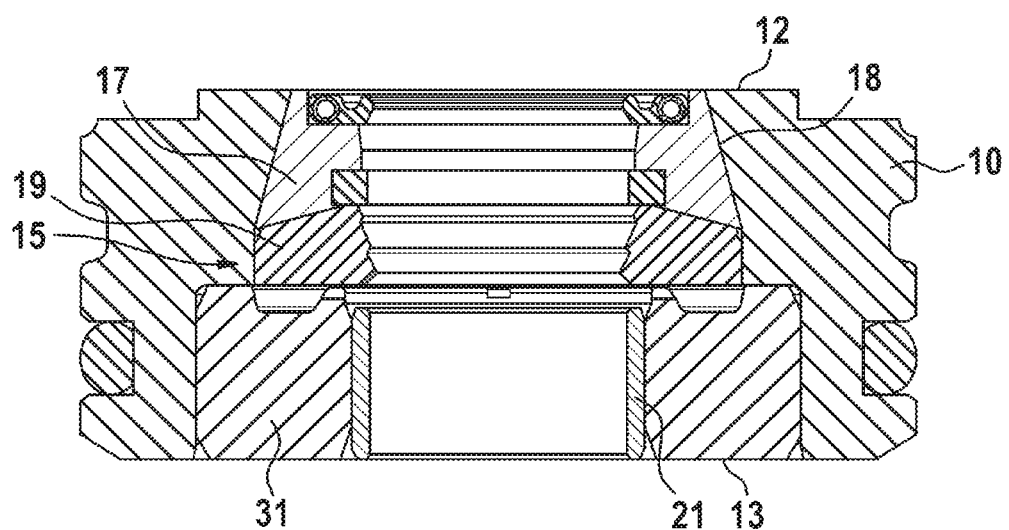
FIG. 2 is a cross-sectional view through another example closure package having a single-part seal.

The closure packages according to FIGS. 1, 2 are illustrated independently of the vibration damper or the damper tube 11, respectively, are thus claimed per se and are suitable for being connected to the damper tube 11 in the manner shown in FIG. 3.

The closure package according to FIG. 1 comprises a base body 10 which, as is illustrated in FIG. 3, can be connected to the damper tube 11. The base body 10 is configured as a rotationally symmetrical component, the external circumference thereof being adapted to the (internal) diameter of the damper tube 11. The base body 10 comprises two axial ends 12, 13, wherein the first end 12 in the assembled state forms the end side 14 of the damper tube 11, as can be seen in FIG. 3. The first end 12 of the base body 10 is thus disposed on the external side of the damper tube 11. The second opposite end 13 in the assembled state is disposed in the damper tube 11, and delimits the first operating chamber 23 in the axial direction.

The base body 10 is sealed in relation to the damper tube 11 by two annular seals 29, 30.

The base body 10 comprises a centric recess in which a seal 15 is disposed. The seal 15 is provided for sealing the piston rod 16, as can be seen in FIG. 3. The seal 15 can be configured in multiple parts, as is illustrated in FIG. 1. To this end, the seal 15 can comprise a rod seal 19 which in use bears on the piston rod 16 and seals the latter in relation to the oil situated in the damper tube 11. The seal 15 furthermore comprises an intermediate seal 20 which in a sealing manner connects the rod seal 19 to the base body 10. The intermediate seal 20 is disposed on the circumference of the rod seal 19. The intermediate seal 20 comprises a larger diameter than the rod seal 19. The intermediate seal 20 and the rod seal 19 are releasably connected to one another.

The rod seal 19 per se can again be configured in multiple parts and comprise an annular seal that is closed by a seal cap. The present disclosure is not limited to a special shape of the seal.

The seal 19 is axially fixed by a seal holder 17, on the one hand, and by a bush holder 31 in the base body 10, on the other hand. The bush holder 31 comprises a centric bore in which a guide bush 21 is fixedly disposed. The guide bush 21 and the seal 19 are mutually aligned. The seal 15 is held in the axial direction in the base body 10 by the seal holder 17.

The seal 17 is disposed on the first end 12 of the base body 10 and in use is situated on the external side of the damper tube 11.

The connection between the seal holder 17 and the base body 10 is performed in a form-fitting and/or force-fitting manner. To this end, the base body 10 comprises a conical holding portion 18 which toward the outside tapers off in the axial direction. The seal holder 17 comprises a corresponding external contour such that holding forces are transmitted to the seal 15. In other words, the external shape of the seal holder 17 corresponds to the internal contour of the base body 10 which is profiled such that the seal holder 17 is held in the axial direction. FIGS. 1 and 2 show the normal state in which the seal holder 17 comprises the thermal dimensional stability thereof.

The embodiment according to FIG. 2 is constructed in a manner similar to that of the embodiment according to FIG. 1, wherein the seal holder 17 projects beyond the seal 19 predominantly in the axial direction. The functional mode is the same as in the initial embodiment according to FIG. 1. The seal holder 17 fixes the seal 15 in the base body 10.

The seal holder 17 is a seal holder which is fusible in an emergency. The term seal holder which is fusible in an emergency means that the seal holder is composed of a material, or includes such a material, which at specific temperatures which exceed the normal operating temperatures loses the thermal dimensional stability of the material. These limit temperatures are set such that the pressures to be expected at these limit temperatures do not lead to the vibration damper exploding or being damaged in an uncontrolled manner. The invention is not limited to a specific limit temperature. Said limit temperature in any case is above the operating temperature of the vibration damper. In other words, the limit temperature corresponds to the thermal dimensional stability temperature of the material of the seal holder 17.

The thermal dimensional stability temperature is generally the temperature at which the seal holder 17 is thermoplastically deformed such that said seal holder 17 is moved out of the base body 10. The form-fitting connection between the base body 10 and the seal holder 17 is cancelled herein.

The fused, or at least plastically deformed, seal holder 17 can then comprise the shape illustrated in FIG. 3, at which the seal holder 17 is released from the conical holding portion 18 of the base body 10. It can be readily seen in FIG. 3 that the seal 15 is moved out of the sealing position in the base body 10. It is indicated by two arrows that the oil situated in the damper tube 11 can leak through the annular gap between the piston rod 16 and the base body 10, said annular gap being exposed by the seal 15.

The invention is not limited to the seal holder consisting entirely of a material which is fusible in an emergency. In the case of a corresponding shape of the seal holder it may be sufficient for the seal holder to be composed only partially of the thermoplastic material which loses the shape thereof at a specific limit temperature.

LIST OF REFERENCE SIGNS

10 Base body
11 Damper tube
12 First end
13 Second end
14 End side of the damper tube
15 Seal
16 Piston rod
17 Seal holder
18 Holding portion
19 Rod seal
20 Intermediate seal
21 Guide sleeve
22 Working piston
23 First operating chamber
24 Second operating chamber
25 Separating piston
26 Gas chamber
29 Annular seal
30 Annular seal
31 Bush holder

What is claimed is:

1. A closure package for a vibration damper, the closure package comprising:
    a base body that is connectable to a damper tube and includes a first end and a second end, wherein the first end forms an end side of the damper tube and the second end is disposed in the damper tube;
    a seal, which for sealing a piston rod, is disposed in the base body; and
    a seal holder that is disposed between the seal and the base body at the first end, wherein the seal holder is for axially fixing the seal and is connected to the base body in at least one of a form-fitting manner or a force-fitting manner, wherein the seal holder is fusible in an emergency, wherein for releasing the connection to the base body the seal holder is thermoplastically deformable upon overheating of the vibration damper.

2. The closure package of claim 1 wherein the seal holder is comprised of a material that has a thermal dimensional stability temperature in a range from −40° C. to +160° C.

3. The closure package of claim 1 wherein the base body comprises a conical holding portion that tapers towards an outside.

4. The closure package of claim 1 wherein at least one of:
    the seal holder is disposed at least in portions on a circumference of the seal, or
    the seal holder in an axial direction of the base body at least in portions projects beyond the seal in a direction toward the first end.

5. The closure package of claim 1 wherein the seal is configured in multiple parts and comprises a first rod seal for bearing on the piston rod and a second intermediate seal for sealing the rod seal relative to the base body, wherein the first rod seal and the second intermediate seal are releasably connected.

6. The closure package of claim 1 wherein a guide bush is disposed between the seal and the second end.

7. A vibration damper including a closure package that comprises:
- a base body that is connectable to a damper tube and includes a first end and a second end, wherein the first end forms an end side of the damper tube and the second end is disposed in the damper tube;
- a seal, which for guiding and sealing a piston rod, is disposed in the base body; and
- a seal holder that is disposed between the seal and the base body at the first end, wherein the seal holder is for axially fixing the seal and is connected to the base body in at least one of a form-fitting manner or a force-fitting manner, wherein the seal holder is fusible in an emergency, wherein for releasing the connection to the base body the seal holder is thermoplastically deformable upon overheating of the vibration damper.

8. The vibration damper of claim 7 configured as a single-tube damper.

9. The vibration damper of claim 7 configured as a dual-tube damper.

10. The vibration damper of claim 7 wherein the damper tube extends along a longitudinal axis, wherein the first end of the base body protrudes longitudinally from the damper tube.

11. The vibration damper of claim 7 wherein a longitudinal end of the damper tube where the base body is disposed is free of a flange that extends radially inward from a cylindrical, longitudinally-extending wall of the damper tube.

12. The vibration damper of claim 7 wherein the seal is disposed radially between the base body and the piston rod.

13. The vibration damper of claim 7 wherein the base body comprises a conical holding portion that tapers radially inwards towards the first end of the base body, wherein the seal holder is disposed within the conical holding portion of the base body and is secured in a longitudinal direction by the conical holding portion.

14. The closure package of claim 1 wherein prior to any thermoplastic deformation of the seal holder upon overheating of the vibration damper, the seal is disposed radially inwards of the base body at a radial plane.

15. The closure package of claim 1 wherein the seal is configured to be disposed radially between the base body and the piston rod.

16. The closure package of claim 14 wherein the base body projects longitudinally beyond both ends of the seal.

17. The closure package of claim 1 wherein the base body comprises a conical holding portion that tapers radially inwards towards the first end of the base body, wherein the seal holder is disposed within the conical holding portion of the base body and is secured in a longitudinal direction by the conical holding portion.

* * * * *